US008724877B2

(12) United States Patent
Yang et al.

(10) Patent No.: US 8,724,877 B2
(45) Date of Patent: May 13, 2014

(54) MIRROR IMAGE SUPPRESSION METHOD

(75) Inventors: Chih-Chung Yang, Taipei (TW);
Chiung-Ting Wu, Taipei (TW);
Cheng-Kuang Lee, Taipei (TW);
Ting-Ta Chi, Taipei (TW)

(73) Assignee: National Taiwan University, Taipei (TW)

( * ) Notice: Subject to any disclaimer, the term of this patent is extended or adjusted under 35 U.S.C. 154(b) by 209 days.

(21) Appl. No.: 13/308,568

(22) Filed: Dec. 1, 2011

(65) Prior Publication Data

US 2013/0088721 A1  Apr. 11, 2013

(30) Foreign Application Priority Data

Oct. 11, 2011  (TW) .............................. 100136754 A

(51) Int. Cl.
*G06K 9/00*  (2006.01)
(52) U.S. Cl.
USPC .......................................... 382/131; 382/128
(58) Field of Classification Search
None
See application file for complete search history.

(56) References Cited

U.S. PATENT DOCUMENTS

| 8,180,134 | B2* | 5/2012 | Wang ............................ 382/131 |
| 2006/0171503 | A1* | 8/2006 | O'Hara et al. ................... 378/21 |
| 2008/0181477 | A1* | 7/2008 | Izatt et al. ....................... 382/128 |
| 2009/0263040 | A1* | 10/2009 | Rolland et al. ................. 382/255 |
| 2010/0226553 | A1* | 9/2010 | Suehira .......................... 382/131 |
| 2010/0226554 | A1* | 9/2010 | Suehira .......................... 382/131 |
| 2012/0162660 | A1* | 6/2012 | Kemp ............................ 356/479 |
| 2012/0188555 | A1* | 7/2012 | Izatt et al. ...................... 356/479 |
| 2012/0224751 | A1* | 9/2012 | Kemp et al. .................... 382/128 |
| 2013/0202176 | A1* | 8/2013 | Izatt et al. ...................... 382/131 |
| 2013/0216115 | A1* | 8/2013 | Iwase et al. .................... 382/131 |

OTHER PUBLICATIONS

Jaillon, F., Makita, S., Yabusaki, M., and Yasuno, Y., Parabolic BM-scan technique for full range doppler spectral domain optical coherence tomography, 2010, Optical Express, vol. 18, No. 2, pp. 1358-1372.*
Jeong, H., Lim, J., Kim, H., Chung, W., and Kim, B., Complex artifact suppression using vestigial sideband filter in Fourier-domain optical coherence tomography, 2012, Optics Letters, vol. 37, No. 23, pp. 4859-4861.*
Wang, R.K., In vivo full range complex Fourier domain optical coherence tomography, 2007, Appl. Phys. Lett., vol. 90, pp. 1-3.*
Wojtkowski, M., Leitgeb, R., Kowalczyk, A., Bajraszewski, T., and Fercher, A.F., In vivo human retinal imaging by Fourier domain optical coherence tomography, 2002, Journal of Biomedical Optics, vol. 7, No. 3, pp. 457-463.*

* cited by examiner

*Primary Examiner* — Stephen R Koziol
*Assistant Examiner* — Jonathan S Lee
(74) *Attorney, Agent, or Firm* — Jianq Chyun IP Office

(57) ABSTRACT

A mirror image suppression method adapted to an optical coherence tomography (OCT) system is provided. The mirror image suppression method includes the following steps: obtaining a tomography image of an object to be tested by using the OCT system; calculating one real image signal obtained from an $n^{th}$ specific-mode scan for a specific pixel of the tomography image based on image signals obtained from an $(n-1)^{th}$ and the $n^{th}$ specific-mode scans; obtaining one real image signal of each of a plurality of pixels in the tomography image based on the calculation in the step of calculating the one real image signal; and reconstructing the tomography image based on the real image signal of each of the pixels obtained in the step of obtaining the one real image signal to suppress mirror image signals of the tomography image.

9 Claims, 4 Drawing Sheets

MIRROR IMAGE SUPPRESSION METHOD

CROSS-REFERENCE TO RELATED APPLICATION

This application claims the priority benefit of Taiwan application serial no. 100136754, filed on Oct. 11, 2011. The entirety of the above-mentioned patent application is hereby incorporated by reference herein and made a part of this specification.

BACKGROUND OF THE INVENTION

1. Field of the Invention

The present invention generally relates to an image processing method, and more particularly to a mirror image suppression method adapted to an optical coherence tomography (OCT) system.

2. Description of Related Art

In the application of Fourier-domain OCT technology, how to suppress mirror image signals of a tomography image to improve the image quality is an important subject to be solved. The mirror image in the tomography image is caused by incomplete information of reverse Fourier transform in a single A-mode scan. In the prior art, phase-shift algorithm is used in combination with a piezoelectric transducer (PZT) to suppress the mirror image. However, such a method requires a phase shift generation mechanism, to achieve the purpose of suppressing the mirror image by generating phase shift between different A-mode scans. Furthermore, an electro-optical modulator (EOM) is also used to suppress the mirror image. In the method, multiple times of A-mode scans must be performed on a same lateral position to achieve the purpose of suppressing the mirror image, resulting in the decrease of an image capture speed and the generation of a motion artifact. However, elimination of these disadvantages may cause the construction of an imaging system to become complex and expensive. In addition to the suppression of the mirror image by using the concept of phase modulation, the mirror image may also be suppressed in a frequency-shift manner by using an acousto-optic modulator (AOM), an EOM, and a dispersive delay line in the prior art.

However, in the prior art, partial loss exists no matter the mirror image is suppressed by using the concept of phase modulation or in the frequency-shift manner. Therefore, it is necessary to provide an effective mirror image suppression method.

SUMMARY OF THE INVENTION

The present invention is directed to a mirror image suppression method, to effectively suppress a mirror image in an OCT image.

The present invention provides a mirror image suppression method adapted to an OCT system. The mirror image suppression method includes: obtaining a tomography image of an object to be tested by using the OCT system; calculating one real image signal obtained from an $n^{th}$ specific-mode scan for a specific pixel of the tomography image based on image signals obtained from an $(n-1)^{th}$ and the $n^{th}$ specific-mode scans; and obtaining one real image signal of each of a plurality of pixels in the tomography image based on the calculation in the step of calculating the one real image signal.

In view of the above, in an exemplary embodiment of the present invention, the mirror image suppression method at least uses image signals obtained from two adjacent A-mode scans to calculate one real image signal obtained from one of the two A-mode scans, so as to suppress the mirror image of the tomography image.

In order to make the above features and advantages of the present invention more comprehensible, embodiments are described in detail below with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
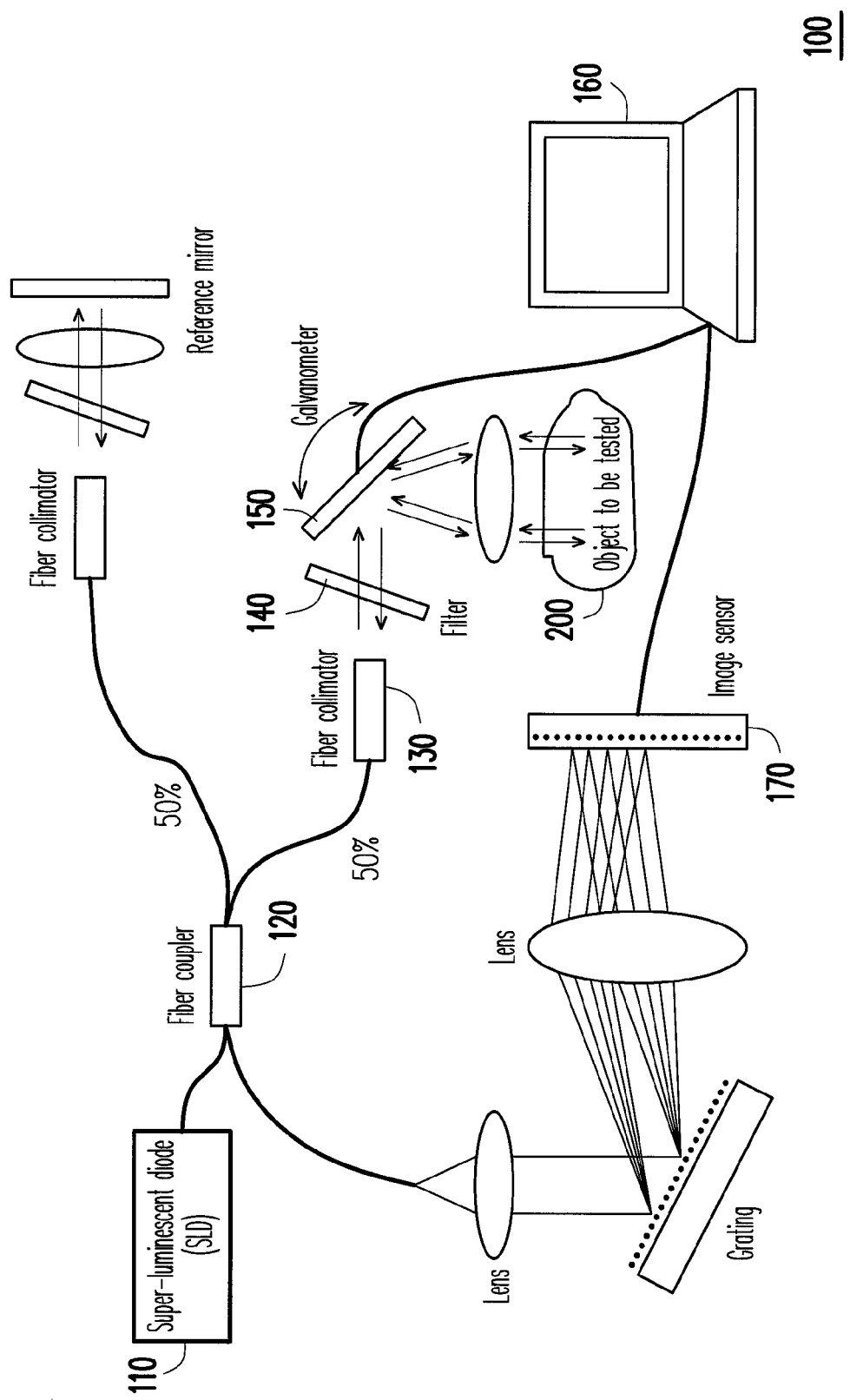
FIG. 1 is a schematic architectural view of an OCT system according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

In an exemplary embodiment of the present invention, a mirror image suppression method is used to generate a phase shift between two adjacent A-mode scans by adjusting a galvanometer of a B-mode scan in an OCT system, and obtain an image signal obtained from the two adjacent A-mode scans. In this case, since a real image signal and a mirror image signal are mutually conjugate complex numbers, the phase shifts of the real image and the mirror image obtained from the two adjacent A-mode scans are reverse to each other. The mirror image suppression method of the present invention uses the property to discriminate a real image from a mirror image in an image signal. In addition, the mirror image suppression method may be adapted to any OCT system capable of generating a phase shift, and the present invention is not limited thereto.

Figure 2:
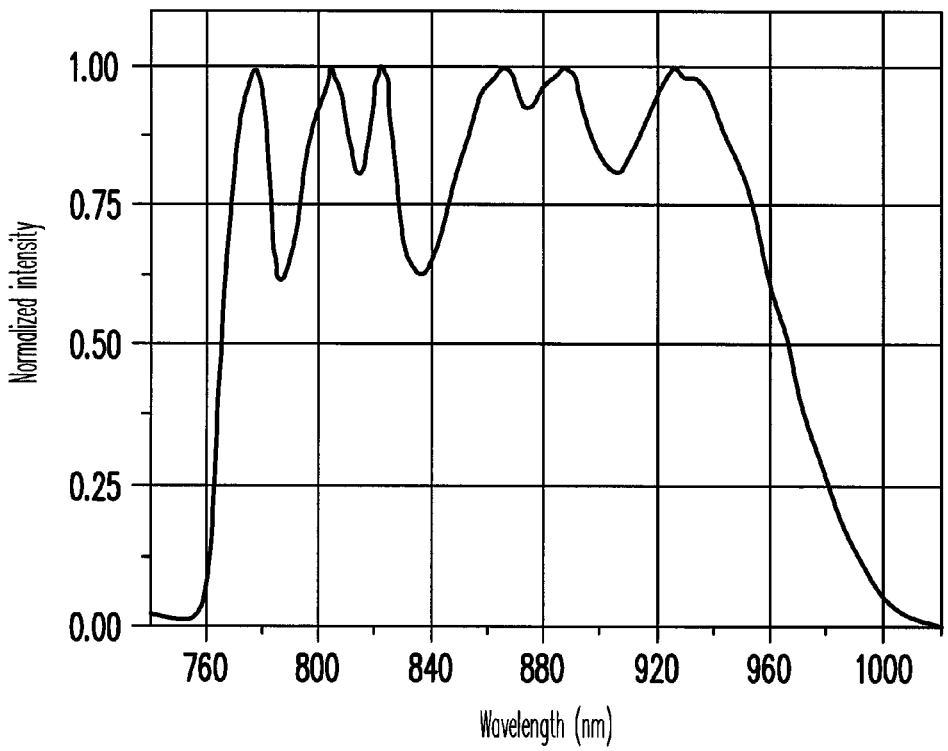
FIG. 2 is a spectrogram of a super-luminescent diode (SLD) in the OCT system shown in FIG. 1.

FIG. 1 is a schematic architectural view of an OCT system according to an embodiment of the present invention. FIG. 2 is a spectrogram of an SLD in the OCT system shown in FIG. 1. Referring to FIGS. 1 and 2, in order to achieve an extremely high longitudinal resolution, an OCT system 100 in this embodiment employs an SLD as a light source 110, the spectrogram thereof is shown in FIG. 2; however, the present invention is not limited thereto.

In this embodiment, a super-luminescent light beam emitted from the light source 110 passes through a fiber coupler 120, a fiber collimator 130, a filter 140, and a galvanometer 150, and is incident on an object to be tested 200, such that a computer system 160 may obtain a tomography image of the object to be tested 200 by an image sensor 170. Herein, the filter 140 is, for example, a neutral density filter (ND filter), which may reduce the quantity of passing light without changing the color thereof. The image sensor 170 is, for example, a charge coupled device (CCD), and used to sense the super-luminescent light beam emitted from the light source 110, so as to generate the tomography image of the object to be tested 200.

Generally, in the OCT technology, the A-mode scan is used to scan a longitudinal depth of a specific position of the object to be tested, to obtain a histogram of the tomography image in a single direction. If the super-luminescent light beam is used to scan at different positions along a surface of the object to be tested, the images obtained from A-mode scans of each position are displayed simultaneously, to obtain the shapes of histological cross sections of the object to be tested, which may be referred to as a B-mode scan, and the result thereof is a two-dimensional (2D) tomography image. In this embodiment, the OCT system 100 uses the B-mode scan to capture the 2D tomography image of the object to be tested. In addition, in order to obtain a tomography image of a longitudinal depth at an adjacent position on the object to be tested, the OCT system 100 scans the object to be tested at different angles by adjusting a galvanometer, to obtain image signals through two adjacent A-mode scans.

Figure 3:
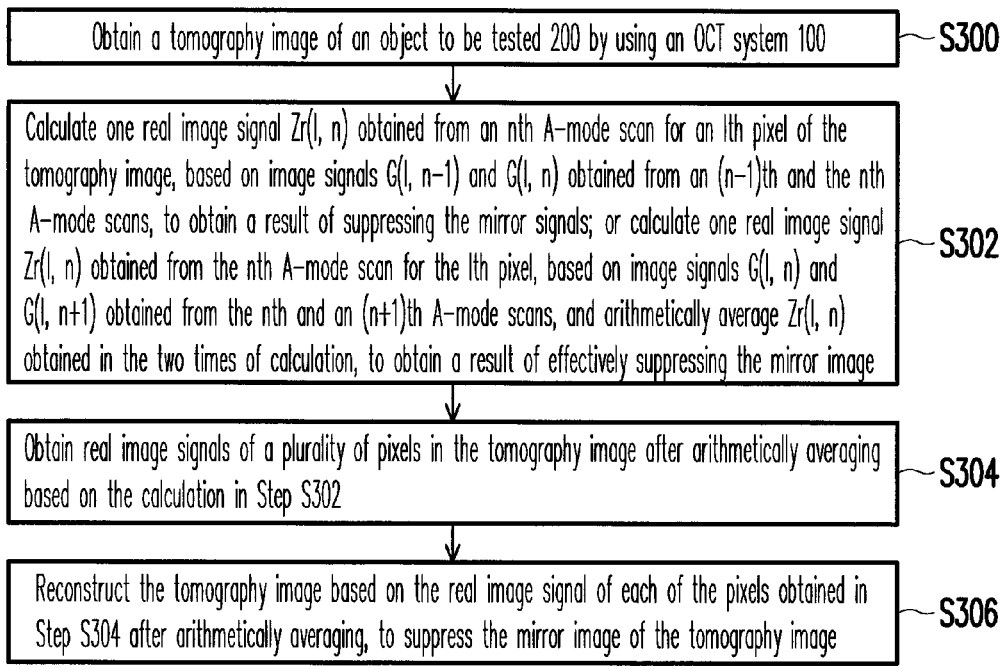
FIG. 3 is a flow chart of a mirror image suppression method according to an embodiment of the present invention.

FIG. 3 is a flow chart of a mirror image suppression method according to an embodiment of the present invention. Referring to FIGS. 1 and 3, the mirror image suppression method according to this embodiment is, for example, adapted to the OCT system 100 shown in FIG. 1. In the embodiment as shown in FIG. 1, the OCT system 100 is exemplified as an SD-OCT system; however, the present invention is not limited thereto. In other embodiments, the OCT system may also be, for example, an SS-OCT system.

In Step S300, a 2D tomography image of the object to be tested 200 is first obtained from the B-mode scan by using the OCT system 100. Since the 2D tomography image obtained from the B-mode scan is displayed by combining the images obtained from the A-mode scans of each position at the surface of the object to be tested, image signals from an $(n-1)^{th}$ and an $n^{th}$ A-mode scans of the 2D tomography image are obtained at the same time. In other words, Step S300 includes scanning the object to be tested 200 based on the $(n-1)^{th}$ and the $n^{th}$ A-mode scans, to obtain two image signals $G(l, n-1)$ and $G(l, n)$ of a specific pixel. The complex number $G(l, n-1)$ represents an image signal of an $l^{th}$ pixel obtained from the $(n-1)^{th}$ A-mode scan in an original OCT signal; the complex number $G(l, n)$ represents an image signal of the $l^{th}$ pixel obtained from the $n^{th}$ A-mode scan in the original OCT signal, and each of the image signals $G(l, n-1)$ and $G(l, n)$ includes a real image signal and a mirror image signal, which may be expressed by formulas below:

$$Zr(l,n-1)+Zm(l,n-1)=G(l,n-1); \text{ and} \qquad (1)$$

$$Zr(l,n)+Zm(l,n)=G(l,n) \qquad (2)$$

where $Zr(l, n-1)$ and $Zm(l, n-1)$ respectively represent the real image signal and the mirror image signal of the $l^{th}$ pixel obtained from the $(n-1)^{th}$ A-mode scan; and $Zr(l, n)$ and $Zm(l, n)$ respectively represent the real image signal and the mirror image signal of the $l^{th}$ pixel obtained from the $n^{th}$ A-mode scan.

Then, in Step S302, one real image signal obtained from one of the two A-mode scans for the $l^{th}$ pixel in the tomography image is calculated, based on the image signals $G(l, n-1)$ and $G(l, n)$ obtained from the $(n-1)^{th}$ and the $n^{th}$ A-mode scans. Specifically, in this embodiment, it is assumed that the real image signal strengths of the two adjacent A-mode scans are equal (that is, $|Zr(l, n-1)|=|Zr(l, n)|$), and the mirror image signal strengths thereof are equal (that is, $|Zm(l, n-1)|=|Zm(l, n)|$). Also, except the phase difference $\theta$ caused by the scanning mechanism (such as the phase shift due to the scanning of a galvanometer), the structure-caused phases of the real image of the two adjacent A-mode scans are equal, and the structure-caused phases of the mirror image of the two adjacent A-mode scans are equal. Therefore, when a scanning-caused phase difference $\theta$ exists between the two adjacent A-mode scans, the following equations are obtained:

$$Zr(l,n)=Zr(l,n-1)\exp(i\theta); \text{ and}$$

$$Zm(l,n)=Zm(l,n-1)\exp(-i\theta),$$

where $\exp(i\theta)$ represents a natural exponential function. Therefore, the formula (2) may be converted into:

$$Zr(l,n-1)\exp(i\theta)+Zm(l,n-1)\exp(-i\theta)=G(l,n) \qquad (3).$$

When the image signals $G(l, n-1)$ and $G(l, n)$ and the phase difference $\theta$ are known, the real image signal $Zr(l, n)$ may be solved from the formulas (1) and (3) as a result of suppressing the mirror image signals. Based on the above calculation, when the image signals $G(l, n-1)$ and $G(l, n)$ and the phase difference $\theta$ are known, $Zm(l, n-1)$, $Zr(l, n-1)$, and $Zm(l, n)$ may also be solved. In addition, when the image signals $G(l, n)$ and $G(l, n+1)$ and the phase difference $\theta$ are known, $Zr(l, n)$ may also be solved. A result of effectively suppressing the mirror image signals is obtained by arithmetically averaging $Zr(l, n)$ obtained from the two times of calculation. Therefore, the purpose of suppressing the mirror image signals is achieved by the above two types of calculation.

In other words, in Step S302, the mirror image suppression method is used to calculate one real image signal obtained from one specific-mode scan for a specific pixel in the tomography image, based on image signals obtained from at least two adjacent specific-mode scans.

Next, in Step S304, real image signals of a plurality of pixels in the tomography image are obtained based on the calculation in Step S302. In addition, the pixels in this step do not exclude the $l^{th}$ pixel (that is, the specific pixel) in Step S302.

Subsequently, in Step S306, the tomography image is reconstructed based on the real image signal of each of the pixels obtained in Step S304 after arithmetically averaging, to obtain a tomography image with a suppressed mirror image.

Figure 4:
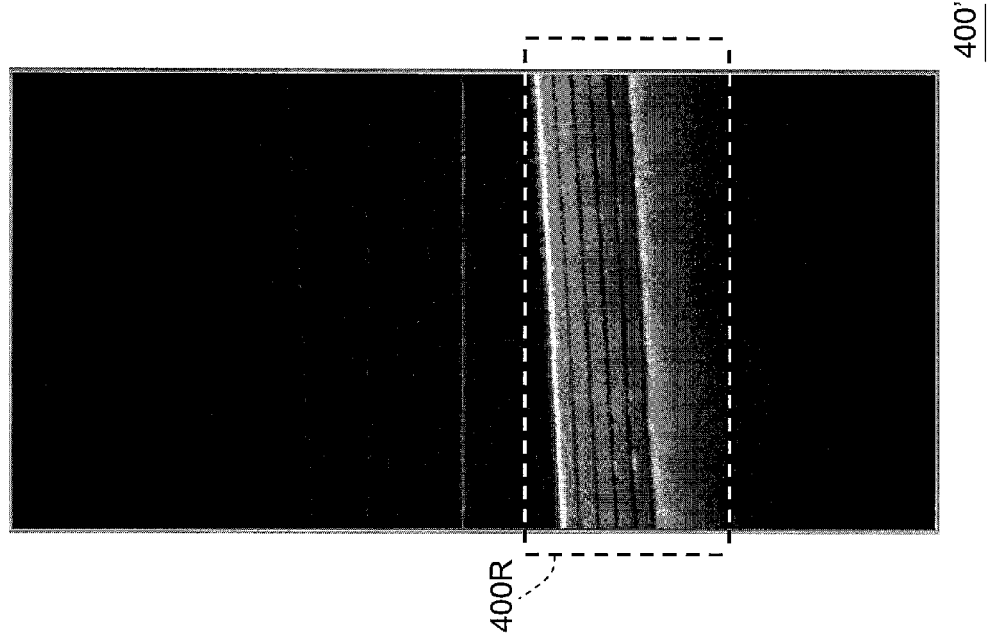
FIG. 4 shows a tomography image with an unsuppressed mirror image according to an embodiment of the present invention.
Figure 5:
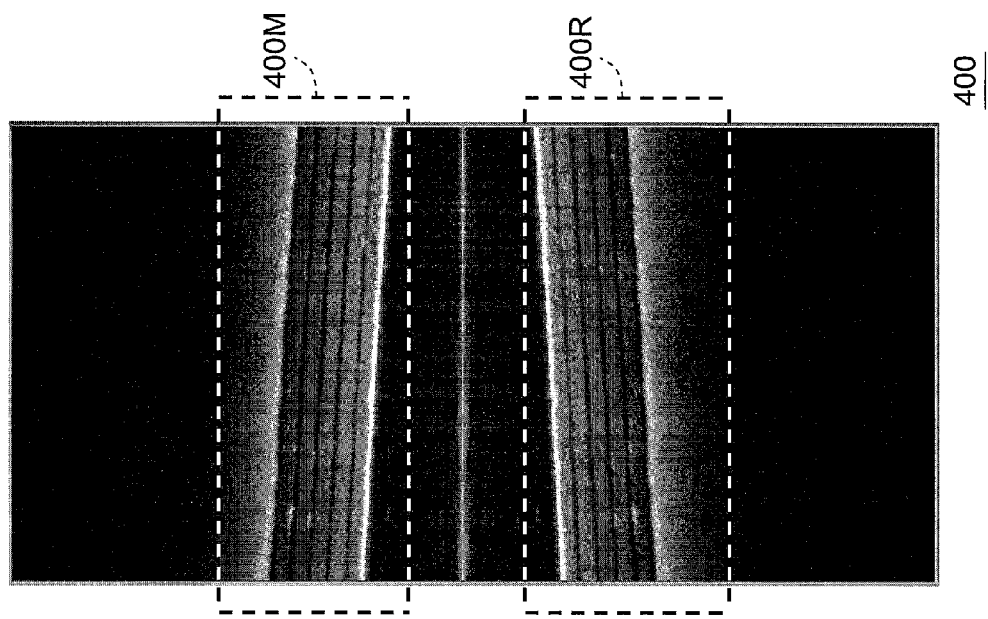
FIG. 5 shows a tomography image obtained by using the mirror image suppression method according to the embodiment.

FIG. 4 shows a tomography image with an unsuppressed mirror image according to an embodiment of the present invention. FIG. 5 shows a tomography image with a suppressed mirror image obtained by using the mirror image suppression method according to the embodiment. Referring to FIGS. 3 to 5, a tomography image with an unsuppressed mirror image in FIG. 4 is, for example, a tomography image 400 of the object to be tested 200 obtained in Step S300 by using the mirror image suppression method shown in FIG. 3, which includes a real image 400R and a mirror image 400M of the object to be tested 200. After the application of the mirror image suppression method according to this embodiment, the mirror image 400M of the tomography image 400 is suppressed, and a tomography image 400' is obtained. It can be known from FIG. 5 that, the mirror image suppression method according to this embodiment may effectively suppress the mirror image of the tomography image, to obtain good image quality.

Figure 6:
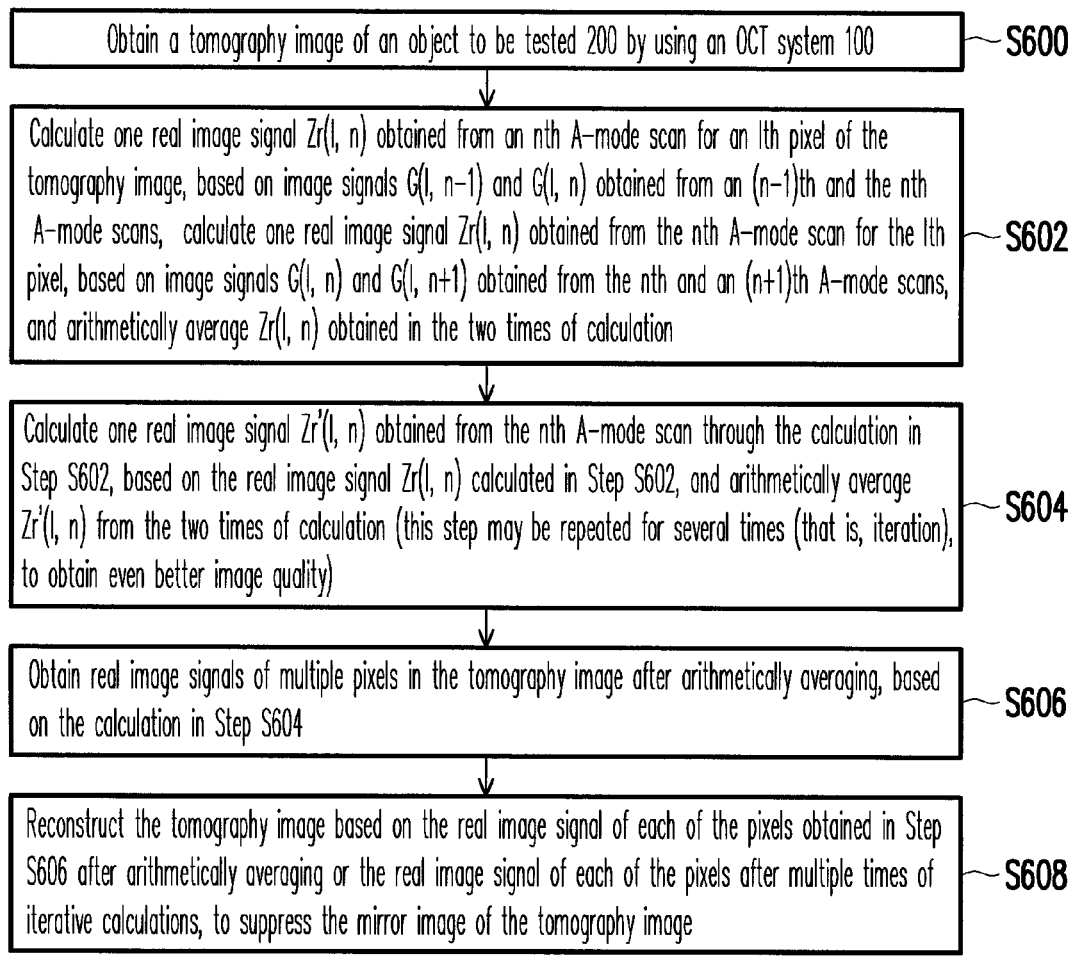
FIG. 6 is a flow chart of a mirror image suppression method according to another embodiment of the present invention.

In addition, the mirror image suppression method according to this embodiment may also be used to suppress the mirror image of the tomography image in combination with the concept of iterative calculation. FIG. 6 is a flow chart of a mirror image suppression method according to another embodiment of the present invention. Referring to FIGS. 3 and 6, the mirror image suppression method of this embodiment is similar to the embodiment shown in FIG. 3, and the main differences lie in, for example, Steps S604 to S608 in this embodiment, which are described as follows.

The mirror image suppression method according to this embodiment is also used to suppress a mirror image in a tomography image by calculating one real image signal obtained from one of two adjacent A-mode scans based on image signals obtained from the two adjacent A-mode scans. Therefore, a real image signal Zr(l, n) obtained in Step S602 may be expressed as follows:

$$\text{Re}\{Zr(l, n)\} = \frac{2\text{Re}\{G(l, n)\}\sin\theta - \text{Im}\{G(l, n-1)\} + \text{Im}\{G(l, n+1)\}}{4\sin\theta};$$

and $$\text{Im}\{Zr(l, n)\} = \frac{2\text{Im}\{G(l, n)\}\sin\theta + \text{Re}\{G(l, n-1)\} + \text{Re}\{G(l, n+1)\}}{4\sin\theta},$$

where Re{ } represents taking a numerical value or a real part of a variable in a bracket; and Im{ } represents taking a numerical value or an imaginary part of a variable in a bracket.

Then, in Step S604, a real image signal Zr'(l, n) obtained from the $n^{th}$ A-mode scan for an $l^{th}$ pixel is recalculated through the calculation in Step S602, based on the real image signal Zr(l, n) calculated in Step S602, and Zr'(l, n) of two times of calculation are arithmetically averaged. Therefore, the mirror image of the real image signal Zr(l, n) may be further suppressed, to obtain better image quality. Step S604 may be repeated for several times (that is, in an iterative manner), to obtain even better image quality.

Next, in Step S606, real image signals of a plurality of pixels in the tomography image after arithmetically averaging are obtained based on the calculation in Step S604. In addition, the pixels in this step do not exclude the $l^{th}$ pixel in Step S602.

Subsequently, in Step S608, the tomography image is reconstructed based on the real image signal of each of the pixels obtained in Step S606 after arithmetically averaging or the real image signal of each of the pixels after multiple times of iterative calculation, to obtain a tomography image with a suppressed mirror image.

Simply, in the exemplary embodiment of the present invention, when the mirror image suppression method proceeds to Step S304, a result of suppressing the mirror image may be obtained by a calculation method of solving simultaneous equations. In another embodiment, when the mirror image suppression method proceeds to Step S604, two adjacent groups of results of suppressing the mirror image are further arithmetically averaged, and the result may be used to thoroughly suppress the mirror image, to further improve the image quality. In still another embodiment, the mirror image suppression method may also further use the result in Step S604 for repeated calculation (iteration), to obtain a new result. In this way, the mirror image may be thoroughly suppressed, so as to further improve the image quality.

To sum up, in the exemplary embodiments of the present invention, the mirror image suppression method is used to calculate one real image signal obtained from one of two specific-mode scans, based on image signals obtained from at least two adjacent specific-mode scans, so as to suppress the mirror image of the tomography image and obtain good image quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mirror image suppression method, adapted to an optical coherence tomography (OCT) system, the method comprising:
    (a) obtaining a tomography image of an object to be tested by using the OCT system;
    (b) calculating one real image signal obtained from an $n^{th}$ specific-mode scan for a specific pixel of the tomography image based on image signals obtained from an $(n-1)^{th}$ and the $n^{th}$ specific-mode scans;
    (c) obtaining one real image signal of each of a plurality of pixels in the tomography image based on the calculation in the step of first calculating the one real image signal;
    (d) calculating one real image signal obtained from the $n^{th}$ specific-mode scan for the specific pixel at the same position, based on image signals obtained from the $n^{th}$ and an $(n+1)^{th}$ specific-mode scans;
    (e) arithmetically averaging the real image signals of the pixel at the same position obtained in the step of first calculating the one real image signal and the step of second calculating the one real image signal; and
    (f) arithmetically averaging the real image signal of each of the pixels in the tomography image based on the calculation in the step of arithmetically averaging the real image signals of the pixel at the same position.

2. The mirror image suppression method according to claim 1, further comprising:
    (g) reconstructing the tomography image based on the real image signal of each of the pixels obtained in the step of first obtaining the one real image signal to suppress mirror image signals of the tomography image.

3. The mirror image suppression method according to claim 1, further comprising:
    (h) calculating one real image signal of the specific pixel through the calculation in the step of first calculating the one real image signal, based on the real image signal of the specific pixel calculated in the step of first calculating the one real image signal, wherein the step of third calculating the one real image signal is repeatable, to obtain one real image signal of the specific pixel after multiple times of iterative calculation;
    (i) obtaining one real image signal of each of the pixels in the tomography image based on the calculation in the step of third calculating the one real image signal, wherein the step of second obtaining the one real image signal is repeatable, to obtain one real image signal of each of the pixels after multiple times of calculation; and
    (j) reconstructing the tomography image based on the real image signal of each of the pixels obtained in the step of second obtaining the one real image signal, to suppress mirror image signals of the tomography image.

4. The mirror image suppression method according to claim 1, further comprising:
    (k) reconstructing the tomography image based on the arithmetic average of the real image signal of each of the pixels obtained in the step of first arithmetically averaging the real image signal of each of the pixels, to suppress mirror image signals in the tomography image.

5. The mirror image suppression method according to claim 1, further comprising:

(l) calculating real image signals of the specific pixel respectively through the calculation in the step of first calculating the one real image signal and the step of second calculating the one real image signal, based on the arithmetic average of the real image signals of the specific pixel calculated in the step of arithmetically averaging the real image signals of the pixel at the same position, and then arithmetically averaging the real image signals of the specific pixel, wherein the step of third calculating the real image signals is repeatable, to obtain one arithmetic average of the real image signals of the specific pixel after multiple times of iterative calculation;

(m) arithmetically averaging the real image signal of each of the pixels in the tomography image based on the calculation in the step of calculating the real image signals, wherein the step of second arithmetically averaging the real image signal of each of the pixels is repeatable, to obtain one arithmetic average of the real image signal of each of the pixels after multiple times of calculation; and (n) reconstructing the tomography image based on the arithmetic average of each of the pixels after multiple times of iterative calculation, to suppress mirror image signals of the tomography image.

6. The mirror image suppression method according to claim 1, wherein the step of obtaining the tomography image comprises:

scanning the object to be tested by using adjacent specific-mode scans, to obtain the image signals of the specific pixel, wherein each of the image signals comprises a real image signal and a mirror image signal.

7. The mirror image suppression method according to claim 1, wherein the specific-mode scan is an A-mode scan.

8. The mirror image suppression method according to claim 1, wherein in the step of obtaining the tomography image, the tomography image of the object to be tested is obtained from a B-mode scan.

9. The mirror image suppression method according to claim 1, wherein the OCT system is a swept-source OCT (SS-OCT) system or a spectral-domain OCT (SD-OCT) system.

* * * * *